(12) United States Patent
Faury et al.

(10) Patent No.: US 11,961,188 B2
(45) Date of Patent: Apr. 16, 2024

(54) NEURAL NETWORKS TO GENERATE APPEARANCE-RESPONSIVE MATERIAL MAP SETS IN DIGITAL GRAPHICAL ENVIRONMENTS

(71) Applicant: Adobe Inc., San Jose, CA (US)

(72) Inventors: Robin Faury, Clermont-Ferrand (FR); Tamy Boubekeur, Paris (FR); Jeremy Levallois, Lyons (FR); Alban Gauthier, Paris (FR); Theo Thonat, Issy les Moulineaux (FR)

(73) Assignee: Adobe Inc., San Jose, CA (US)

( * ) Notice: Subject to any disclaimer, the term of this patent is extended or adjusted under 35 U.S.C. 154(b) by 49 days.

(21) Appl. No.: 17/835,754

(22) Filed: Jun. 8, 2022

(65) Prior Publication Data

US 2023/0401793 A1 Dec. 14, 2023

(51) Int. Cl.
*G06T 17/30* (2006.01)
*G06T 7/00* (2017.01)
*G06T 15/04* (2011.01)

(52) U.S. Cl.
CPC .............. *G06T 17/30* (2013.01); *G06T 7/97* (2017.01); *G06T 15/04* (2013.01);
(Continued)

(58) Field of Classification Search
None
See application file for complete search history.

(56) References Cited

U.S. PATENT DOCUMENTS

| 6,699,497 B1 | 3/2004 | Van Osdol et al. |
| 10,410,400 B1 | 9/2019 | Aksit et al. |

(Continued)

FOREIGN PATENT DOCUMENTS

| CN | 113421335 A | 9/2021 |
| WO | 2017/214040 A1 | 12/2017 |

OTHER PUBLICATIONS

Bruneton, et al., "A survey of non-linear pre-filtering methods for efficient and accurate surface shading", IEEE Transactions on Visualization and Computer Graphics, 2011.
Dupuy, et al., "Linear efficient antialiased displacement and reflectance mapping", ACM Transactions on Graphics (TOG), 2013, 1-11.
Han, et al., "Frequency domain normal map filtering", ACM Transactions on Graphics, 2007.
(Continued)

*Primary Examiner* — Sultana M Zalalee
(74) *Attorney, Agent, or Firm* — Kilpatrick Townsend & Stockton LLP (57) ABSTRACT

An appearance-responsive material map generation system generates a set of material maps based on the appearance of a material depicted in the source material data. A neural network included in the appearance-responsive material map generation system is trained to identify features of particular source material data, such as features that contribute to a highly realistic appearance of a graphical object rendered with the material depicted in the source material data. In some cases, the trained neural network receives source material data that includes at least one source material map. Based on the features that are identified for the particular source material data, the appearance-responsive material map generation system creates a respective set of appearance-responsive material maps for the particular source material data. In some cases, the appearance-responsive rendering map set is arranged as an inconsistent pyramid of material maps.

20 Claims, 5 Drawing Sheets

(52) U.S. Cl.
CPC ............................. *G06T 2200/04* (2013.01);
*G06T 2207/20081* (2013.01); *G06T 2207/20084* (2013.01)

(56) References Cited

U.S. PATENT DOCUMENTS

| | | | | |
|---|---|---|---|---|
| 11,158,121 | B1* | 10/2021 | Tung | G06N 3/045 |
| 2019/0347526 | A1* | 11/2019 | Sunkavalli | G06N 3/084 |
| 2021/0118123 | A1* | 4/2021 | Fang | G01N 21/31 |
| 2021/0295592 | A1* | 9/2021 | von Cramon | G06N 3/08 |
| 2021/0350503 | A1 | 11/2021 | Hobson | |
| 2022/0215266 | A1* | 7/2022 | Venkataraman | G06N 3/088 |
| 2022/0351346 | A1* | 11/2022 | Guo | G06T 5/50 |
| 2022/0351455 | A1 | 11/2022 | Wang | |
| 2023/0027890 | A1* | 1/2023 | Zhao | G06T 15/10 |
| 2023/0145496 | A1* | 5/2023 | Garcés | G06T 3/4046 345/428 |

OTHER PUBLICATIONS

Hasselgren, et al., "Appearance-driven automatic 3d model simplification", Eurographics Symposium on Rendering, 2021.
Hery, et al., "Geometry into shading", Technical report, 2014.
Hery, et al., "Pixar's foundation for materials", Technical report, 2017.
Kuznetsov, et al., "Neumip: Multi-resolution neural materials", Transactions on Graphics (Proceedings of SIGGRAPH), 2021.
Olano, et al., "Lean mapping", Proceedings of the 2010 ACM SIGGRAPH symposium on Interactive 3D Graphics and Games, 2010, 181-188.
Toksvig, et al., "Mipmapping Normal Maps", Journal of Graphics Tools, 10(3), 2005, 65-71.
Examination Report from related GB Application No. GB2305183.2 dated Oct. 20, 2023, 7 pages.

* cited by examiner

NEURAL NETWORKS TO GENERATE APPEARANCE-RESPONSIVE MATERIAL MAP SETS IN DIGITAL GRAPHICAL ENVIRONMENTS

TECHNICAL FIELD

This disclosure relates generally to the field of machine learning, and more specifically relates to neural networks for generating material data.

BACKGROUND

Digital graphical environments can include multiple graphical objects with various surfaces or appearance. For example, an interactive virtual environment, such as a computer-implemented game, could include graphical objects that are viewed or interacted with in the graphical environment, such as virtual interactions by a user or an additional computing system. The example graphical objects may have a variety of materials with particular appearances and textures, such as wood, metal, fur, grass, leather, or other materials that have various surfaces. In some cases, such as for an interactive computer-implemented game environment, it is desirable for graphical objects to have high realism, such as a realistic appearance of responding to changes in the computer-implemented game environment (for example, changes in surrounding virtual lighting). In some cases, it is desirable for graphical objects to be highly responsive to user activities, such as fast rendering with realistic texture appearance as a user adjusts an in-game viewpoint or performs other activities with the computer-implemented environment.

Existing techniques to generate highly realistic graphical objects include using precalculated material maps, such as mipmaps or other types of downscaled material maps, to render a texture or other appearance of a graphical object based on a distance between the graphical object and a viewpoint within a computer-implemented digital graphical environment. However, contemporary techniques to generate material maps include a naïve reduction in size or detail, such as a set of material maps that are calculated at sequentially reduced resolutions. Sets of precalculated material maps that are generated via contemporary techniques may include material data that does not preserve visual features of source material data for the material maps.

SUMMARY

According to certain embodiments, an appearance-responsive material map generation system generates a set of material maps based on the appearance of a material depicted in the source material data. A neural network included in the appearance-responsive material map generation system is trained to identify features of particular source material data, such as features that contribute to a highly realistic appearance of a graphical object rendered with the material depicted in the source material data. In some cases, the trained neural network receives, as an input, source material data that includes at least one source material map. Based on the features that are identified for the particular source material data, the appearance-responsive material map generation system creates a respective set of appearance-responsive material maps for the particular source material data. In some cases, the appearance-responsive rendering map set is arranged as an inconsistent pyramid of material maps.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE DRAWINGS

Features, embodiments, and advantages of the present disclosure are better understood when the following Detailed Description is read with reference to the accompanying drawings, where.

DETAILED DESCRIPTION

As discussed above, prior techniques for generating material maps include naïve precalculation of a set of material maps, such as a set of material maps that are precalculated at a specific set of resolutions. In some cases, naïve precalculation of material maps provides appearance preservation at specific surface regions based on the specific set of resolutions. An example of a contemporary set of precalculated material maps is a mipmap pyramid. In a contemporary mipmap pyramid, a material map that represents a surface appearance of a graphical object is reduced in size and detail at a particular sequence of resolution reductions, such as a first mipmap at full resolution, a second mipmap at half-resolution, a third mipmap at quarter-resolution, and additional mipmaps at additional sequential resolution reductions. Contemporary techniques to generate sets of material maps can perform a predetermined sequence of resolution reductions, such as reductions by 50%, reductions by 80%, etc. In addition, contemporary techniques to generate sets of material maps can perform a predetermined quantity of resolution reductions to generate a particular quantity of material maps, such as a mipmap pyramid having thirteen layers (e.g., thirteen maps generated according to the predetermined sequence of resolution reductions). In some cases, contemporary techniques to generate sets of material maps preserve surface appearance at the predetermined sequence of resolution reductions, without consideration of whether the preserved appearance contributes to a highly realistic appearance of a graphical object rendered with the precalculated material maps.

However, prior techniques for generating material maps do not provide material maps that are responsive to an appearance of the represented texture. Nor do the prior techniques for generating material maps provide a set of material maps with a quantity of maps (e.g., pyramid layers)

responsive to the appearance of the represented texture. Certain embodiments described herein provide for an appearance-responsive material map generation system that generates a set of material maps based on the appearance of the texture depicted in the source material data. A neural network included in the appearance-responsive material map generation system is trained to identify features of a particular source material data, such as features that contribute to a highly realistic appearance of a graphical object rendered with the texture from the source material data. In some cases, the trained neural network identifies features that are different among various source material maps that are included in the source material data. Based on the features that are identified for each particular source material map, the appearance-responsive material map generation system creates a respective set of appearance-responsive material maps for the particular source material map. Among the various source material maps, the respective sets of appearance-responsive material maps could have different material data extracted from the source maps, different map sizes, different quantities of maps, or other variations that are responsive to the respective appearances of the source material maps. In some cases, sets of appearance-responsive material maps generated by the appearance-responsive material map generation system provide improved appearance of rendered objects as compared to contemporary material maps that provide naïve appearance preservation at precalculated surface regions. In addition, sets of appearance-responsive material maps generated by the appearance-responsive material map generation system provide improved appearance of rendered objects while utilizing computing resources that are similar to resources used by contemporary sets of precalculated material maps. For example, a computing device implementing a graphical environment could render graphical objects with improved visual appearance using appearance-responsive material map sets, as compared to rendering objects using contemporary sets of material maps. In addition, the appearance-responsive material map sets could utilize similar or reduced computing resources as compared to the contemporary sets of material maps, such as computing resources for storage, processing power, or specialized computing components (e.g., graphics processing unit, "GPU") that are configured to render graphical objects utilizing material map sets. In some cases, the appearance-responsive material map sets enable the example computing device to provide a rendered graphical object with improved appearance while utilizing similar or reduced computing resources.

The following examples are provided to introduce certain embodiments of the present disclosure. An appearance-responsive material map generation system receives a group of source material maps. The source material maps could include material data for roughness, metallic, albedo, normal, displacement, or other types of data that describe appearance of a texture in a graphical environment. The appearance-responsive material map generation system provides the source material maps to a trained material map generation neural network. The trained material map generation neural network is configured to identify, in the source material maps, features that contribute to a realistic visual appearance of a graphical object rendered with the source material. By modifying input material data from the source material maps based on the identified features, the trained material map generation neural network generates output material data. For example, the output material data could be a data element (e.g., a pixel, a texel, a vector value) that is a combination of additional data elements from the input material data. In addition, the combination could be described by the identified features, such as features that describe relationships among data elements in the input material data.

Continuing with this example, the appearance-responsive material map generation system generates a set of appearance-responsive material maps using the output material data received from the trained material map generation neural network. The appearance-responsive material map set includes multiple material maps that have various resolutions, sizes, reflectivity, color, or other material data characteristics. In some cases, the appearance-responsive material map set is arranged as a pyramid, such as an inconsistent pyramid in which pyramid layers have varying or different relationships. For example, the appearance-responsive material map generation system could generate an inconsistent pyramid of the appearance-responsive material maps, in which material data that is included in a particular layer (e.g., determined based on the identified features of the source material maps) changes by inconsistent amounts across various layers of the pyramid.

The example appearance-responsive material map generation system provides the appearance-responsive material map set to a rendering engine, such as a rendering engine implemented by an additional computing system. For example the appearance-responsive material map set is received by a computing device implementing an interactive graphical environment, such as a game environment. A rendering engine implemented by the computing device renders graphical objects based on the appearance-responsive material map set. In addition, the rendering engine renders the graphical objects to have a surface texture that is described by the appearance-responsive material map set. The computing device provides the rendered graphical objects within the interactive graphical environment, such that a user of the computing device could view or otherwise interact with the rendered graphical objects.

In some embodiments, an appearance-responsive material map set includes material data that contributes to a highly realistic appearance of a rendered graphical object. In addition, the appearance-responsive material map set omits material data (e.g., from source material maps) that does not contribute to the highly realistic appearance of the rendered graphical object. For instance, the appearance-responsive material map set could omit material data that generates visual artifacts or other poor-quality visual characteristics in the rendered graphical object, such as aliasing, jagged edges, or other types of visual artifacts. In some cases, the appearance-responsive material map set provides equivalent or improved rendering quality for rendering of graphical objects in a computer-implemented graphical environment, as compared to contemporary sets of material maps. Additionally or alternatively, rendering a graphical object based on the appearance-responsive material map set generates a 3D graphical object with higher-quality visual appearance while consuming similar computing resources compared to rendering with contemporary sets of material maps. For instance, a GPU or other computing component that receives the appearance-responsive rendering map set could render a graphical object with improved visual appearance while utilizing similar memory, processing power, or other computing resources as compared to rendering with contemporary maps In some cases, the appearance-responsive material map set includes material data identified by a neural network as contributing to a highly realistic appearance of the graphical object, compared to a contemporary set of material maps with material data selected naïvely at a predetermined sequence of resolution reductions, which might or might not contribute to a realistic appearance of the graphical object.

Certain embodiments described herein provide improvements to material map generation systems. For example, a material map generation neural network described herein identifies features of input material data, such as source material maps, by applying particular rules that describe relationships among data elements (e.g., pixels, texels, vector values) in the input material data. Additionally or alternatively, an appearance-responsive material map generation system described herein generates a set of appearance-responsive material maps by applying additional particular rules to output material data provided by a material map generation neural network. In some cases, the application of these rules by the material map generation neural network or the appearance-responsive material map generation system achieves an improved technological result, such as by generating a set of appearance-responsive material maps that compactly represents material data that contributes to rendering a graphical object with highly realistic appearance and omits material data that does not contribute to the highly realistic appearance of the graphical object. Additionally or alternatively, the application of these rules improves functioning of a computing system, such as by enabling a computing device that implements a graphical environment to more efficiently render graphical objects with a highly realistic appearance.

Figure 1:
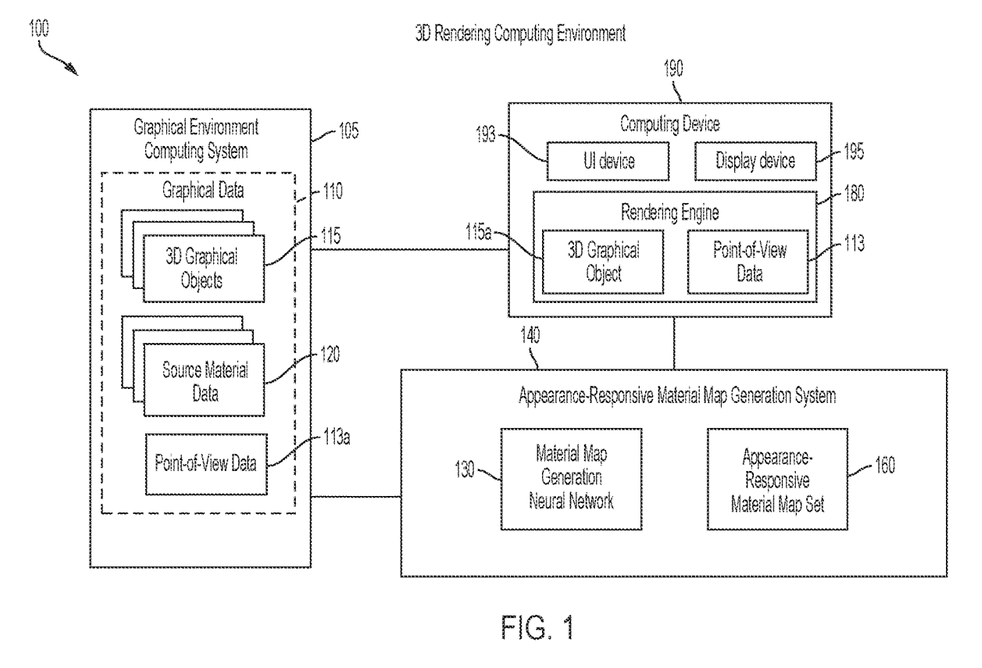
FIG. 1 is a diagram depicting an example of a computing environment in which three-dimensional graphical objects are rendered, according to certain embodiments.

Referring now to the drawings, FIG. 1 is an example of a computing environment in which three-dimensional ("3D") graphical objects are rendered, such as a 3D rendering computing environment 100. The 3D rendering computing environment 100 includes a graphical environment computing system 105 and an appearance-responsive material map generation system 140. In addition, the 3D rendering computing environment 100 includes at least one additional computing system, such as a computing device 190, that is configured to implement a digital graphical environment. In some cases, the graphical environment computing system 105, the appearance-responsive material map generation system 140, the computing device 190, and one or more additional computing systems are configured to exchange data via one or more computing networks, such as a local or global area network. FIG. 1 depicts communicative connections, such as network connections, among the graphical environment computing system 105, the appearance-responsive material map generation system 140, and the computing device 190, but other implementations are possible. For example, a graphical environment computing system could include or otherwise handle communications for an appearance-responsive material map generation system, such that an additional computing device receives data from the appearance-responsive material map generation system via the graphical environment computing system.

In some embodiments, the computing device 190 or one or more additional computing systems are configured to implement the digital graphical environment based on information received from (or provided to) the graphical environment computing system 105. For example, the graphical environment computing system 105 is configured to provide data for implementing an interactive game environment, an education simulation environment, an environment for artistic collaboration, or other types of digital graphical environments. In some cases, the computing device 190 implements the digital graphical environment (or a portion thereof) based on data received from the graphical environment computing system 105. For example, the computing device 190 configures at least one display device 195 to display image data that describes the digital graphical environment (or a local instance thereof). Additionally or alternatively, a user of the computing device 190 could interact with the digital graphical environment via inputs to at least one user interface device 193. In some cases, the computing device 190 generates point-of-view data 113 that describes a point of view (e.g., a position, a viewing angle, a rotation) of a user data object (e.g., a computer-implemented character) within the digital graphical environment. For example, the computing device 190 generates or modifies the point-of-view data 113 responsive to inputs provided via the user interface device 193, such as inputs that move (or perform other actions by) the user data object within the digital graphical environment.

In FIG. 1, the computing device 190 includes a rendering engine 180. The rendering engine 180 is configured to render one or more graphical objects within the digital graphical environment, such that the rendered objects can be displayed via the display device 195. In some cases, the rendering engine 180 performs calculations related to rendering an appearance of graphical objects, and the computing device 190 (or other sub-modules thereof) performs additional calculations related to additional aspects of the digital graphical environment, such as calculating the point-of-view data 113 responsive to user inputs. Additionally or alternatively, the rendering engine 180 renders graphical objects based on data that is received from the graphical environment computing system 105, such as at least a portion of graphical data 110. In some cases, the graphical data 110 includes data for rendering graphical objects within the digital graphical environment. For example, the graphical data 110 includes data describing one or more 3D graphical objects 115. Additionally or alternatively, the graphical data 110 includes data describing one or more source material data 120, such as material data that describes respective textures (e.g., visual appearances) of the 3D graphical objects 115. In some cases, the graphical environment computing system 105 includes point-of-view data 113a in the graphical data 110, such as a local copy of the data point-of-view data 113, e.g., received from the computing device 190.

In some embodiments, the digital graphical environment is implemented based on information that is exchanged among computing systems or computing devices included in the 3D rendering computing environment 100. For example, the graphical environment computing system 105 may identify, responsive to receiving the point-of-view data 113a, that the user data object is approaching a particular one of the 3D graphical objects 115, such as a 3D graphical object 115a. The graphical environment computing system 105 provides to the computing device 190 data describing the 3D graphical object 115a, such as a location, a shape, interaction capabilities, or other characteristics of the 3D graphical object 115a.

Additionally or alternatively, the computing device 190 receives data describing a texture of the 3D graphical object 115a, such as an appearance-responsive material map set 160. The appearance-responsive material map set 160 includes one or more material maps that are generated via the appearance-responsive material map generation system 140. For example, a material map generation neural network 130 included in the appearance-responsive material map generation system 140 is trained to identify features of one or more of the source material maps 120, such as features that contribute to a visual appearance of the 3D graphical object 115a. Additionally or alternatively, the appearance-responsive material map generation system 140 generates the appearance-responsive material map set 160 based on the identified features, such as by combining material data from the source material data 120 using relationships described by the identified features. In some cases, the appearance-responsive material map set 160 includes maps that depict material at different scales of visibility, such as visibility at various distances within the digital graphical environment. For example, if a user views the 3D graphical object 115*a* at a relatively close distance (such as indicated by the point-of-view data 113), the 3D graphical object 115*a* includes a relatively high scale of detail, such as displayed image data that depicts subtle indentations or protrusions on the object surface. Additionally or alternatively, if the user views the 3D graphical object 115*a* at a relatively far distance, the 3D graphical object 115*a* includes a relatively low scale of detail, such as displayed image data that depicts a relatively uniform appearance without much visible variation on the object surface.

In some cases, the computing device 190 receives the appearance-responsive material map set 160 from the graphical environment computing system 105. For example, the graphical environment computing system 105 could provide the map set 160 to the computing device 190 responsive to identifying (e.g., based on the point-of-view data 113*a*) that the user data object is within a threshold distance of the 3D graphical object 115*a* in the digital graphical environment. Additionally or alternatively, the computing device 190 receives the appearance-responsive material map set 160 from the appearance-responsive material map generation system 140. For example, the system 140 could provide the map set 160 to the computing device 190 responsive to data received from graphical environment computing system 105.

In FIG. 1, the computing device 190 generates or modifies one or more portions of the digital graphical environment based on the appearance-responsive material map set 160. For example, the rendering engine 180 renders the 3D graphical object 115*a* using the map set 160, such that the rendered 3D graphical object 115*a* has a visual appearance described by the map set 160. Additionally or alternatively, the computing device 190 causes the display device 195 to display the rendered 3D graphical object 115*a*, e.g., within a displayed portion of the digital graphical environment. In some cases, the computing device 190 modifies the rendered 3D graphical object 115*a* based on additional data related to the digital graphical environment. For example, if a user interacts with the rendered 3D graphical object 115*a*, e.g., via an input provided to the user interface device 193, the rendering engine 180 could modify the rendered 3D graphical object 115*a* to have a modified visual appearance that is also described by the map set 160. As an example modification, if the rendered 3D graphical object 115*a* is a data object describing a virtual ball, the rendering engine 180 could modify the rendered 3D graphical object 115*a* to have a less detailed appearance responsive to interaction data indicating the user has thrown (e.g., interaction data describing a throw activity) the ball data object farther away from the user data object. In this example, the scale of detail visible on the ball data object is reduced based on an increased distance between the ball data object and the user data object.

In some implementations, an appearance-responsive material map generation system includes a material map generation neural network that is configured for identifying, in one or more source material maps, features that contribute to a high-quality (e.g., realistic) visual appearance of a graphical object. In some cases, the material map generation neural network is configured to identify the features based on input material data, such as source material data that includes a group of source material maps. Additionally or alternatively, the material map generation neural network is configured to output material data for an appearance-responsive material map set, based on the identified features. In some cases, the output material data is arranged as a pyramid, such as a set of material maps in which pyramid layers (e.g., maps) have a general relationship, such as decreasing map resolution. For example, the output material data could be arranged as a pyramid in which highest resolution layer has a size of 4096×4096 data elements (e.g., pixels, texels, vector values), a next-highest resolution layer has a size of 2048×2048 data elements, and additional layers have additional sizes. In some cases, the output appearance-responsive material map set is arranged as an inconsistent pyramid, in which pyramid layers include material data with varying or different relationships, such as appearance-responsive material maps that include various combinations of material data from the source material maps. Additionally or alternatively, the combinations of material data are selected based on the identified features of the source material maps, such that output material data in the appearance-responsive material map set have inconsistent relationships within or across various layers. In this example, the appearance-responsive material maps may be arranged as an inconsistent pyramid that is different from a conventional set of maps arranged as a consistent pyramid. For example, material data in the consistent pyramid may be selected based on a predetermined relationship of sequential resolution reductions (e.g., full resolution, one-half reduction, one-quarter reduction, etc.), or other types of predetermined relationships that do not account for features of source material data.

Figure 2:
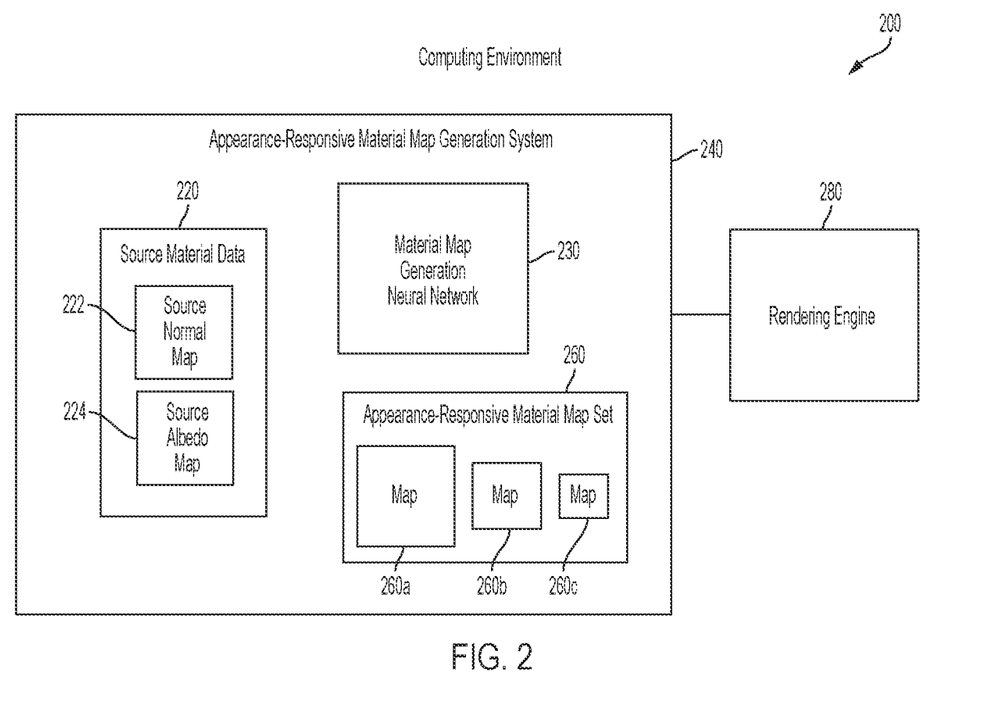
FIG. 2 is a diagram depicting an example of a computing environment that includes an appearance-responsive material map generation system, according to certain embodiments.

FIG. 2 depicts an example of a computing environment 200 in which an appearance-responsive material map generation system 240 is configured to generate an appearance-responsive material map set 260. The computing environment 200 includes the appearance-responsive material map generation system 240 and a rendering engine 280. In some embodiments, the appearance-responsive material map generation system 240 is included in, or configured to communicate with, one or more additional computing systems. For example, the appearance-responsive material map generation system 240 is capable of communicating with one or more additional computing systems in a 3D rendering computing environment, such as the graphical environment computing system 105 or the computing device 190.

FIG. 2 depicts the rendering engine 280 as a computing module communicatively coupled with the appearance-responsive material map generation system 240, but other implementations are possible. For example, appearance-responsive material map generation system 240 could provide the appearance-responsive material map set 260 to an additional computing system that includes a rendering engine, such as a computing system that is configured to implement a digital graphical environment (e.g., the computing device 190, the graphical environment computing system 105).

In the computing environment 200, the appearance-responsive material map generation system 240 includes a material map generation neural network 230 that is configured to identify features of input material data that contribute to a visual appearance of a graphical object. In some cases, the material map generation neural network 230 is configured via a training or re-training process. Additionally or alternatively, the appearance-responsive material map generation system 240 generates the appearance-responsive material map set 260 based on the features identified by the material map generation neural network 230. In some cases, the features identify characteristics of the input material data that contribute to a high-quality visual appearance of rendered graphical objects, such as 3D graphical objects that are rendered by the rendering engine 280.

In FIG. 2, the appearance-responsive material map generation system 240 receives source material data, such as source material data 220. The source material data 220 includes one or more source material maps that describe visual surface appearance characteristics, such as roughness, albedo, metallic, normal, displacement, or other characteristics of visual appearance. In the source material data 220, each of the source material maps is a data object that includes material data. For example, a source normal map 222 in the source material data 220 is a source map data object with values that describe surface normals, such as data values describing perpendicular vectors that indicate variations in the described surface texture. Additionally or alternatively, a source albedo map 224 in the source material data 220 is a source map data object with values that describe albedo, such as data values describing reflectivity of the described surface texture. As an example, if the source material data 220 represents a leather surface, the source normal map 222 and the source albedo map 224 could indicate relatively high variations in the surface normals and relatively low albedo, indicating that the leather surface has many variations (e.g., wrinkles, cracks) and does not reflect much light. As an additional example, if the source material data 220 represents a metal surface, the source normal map 222 and the source albedo map 224 could indicate relatively low variations in the surface normals and relatively high albedo, indicating that the metal surface is smooth with few variations and reflects a large amount of light. In some cases, one or more of the source maps 222 or 224 could include data values indicating mathematical data, image data, or other types of material data, including material data that is not intended for human interpretation (e.g., prior to rendering a graphical object).

FIG. 2 depicts the source material data 220 as including the source normal map 222 and the source albedo map 224, but other implementations are possible, such as additional source material maps for roughness, metallic, displacement, or other visual appearance characteristics. In some cases, source material data includes one source map, such as a source albedo map. Additionally or alternatively, source material data includes multiple source maps, such as a combination of two or more material maps describing roughness, albedo, metallic, normal, displacement, or other visual appearance characteristics.

In some implementations, the appearance-responsive material map generation system 240 receives the source material data 220 from an additional computing system, such as the graphical environment computing system 105 described in respect to FIG. 1. In some cases, the source material data 220 received is a portion of additional material data that is included in the additional computing system. For instance, the additional computing system could maintain material data that is arranged as a consistent pyramid of material maps in which each layer has a predetermined relationship with an additional layer. Additionally or alternatively, the appearance-responsive material map generation system 240 receives a particular layer of the consistent pyramid, such as a high-resolution normal map (e.g., the source normal map 222) or a high-resolution albedo map (e.g., the source albedo map 224). In some cases, the appearance-responsive material map generation system 240 generates the appearance-responsive material map set 260 from a high-resolution layer of a consistent pyramid of material maps, without utilizing additional layers from the consistent pyramid.

In the appearance-responsive material map generation system 240, the material map generation neural network 230 receives the source material data 220 as input material data. In some embodiments, the material map generation neural network 230 is a trained neural network, such as a fully-connected multi-layer perceptron or another suitable type of neural network. In some cases, the material map generation neural network 230 includes a combination of multiple neural networks, such as multiple subnetworks that are trained separately or together. The material map generation neural network 230 is configured to receive input material data, such as one or more source material maps. Additionally or alternatively, the material map generation neural network 230 is configured to identify features of the input material data that contribute to a visual appearance of a 3D graphical object. For example, the material map generation neural network 230 identifies, from the maps 222 and 224, features that contribute to a visual appearance of a graphical object rendered using the maps 222 and 224. In some cases, the material map generation neural network 230 is trained to identify features based on a groundtruth object, such as a high-quality rendering of a 3D graphical object. During training or retraining, for example, the appearance-responsive material map generation system 240 receives a rendered 3D graphical object, such as a training object received from the rendering engine 280. Additionally or alternatively, the appearance-responsive material map generation system 240 (or the material map generation neural network 230) calculates one or more difference values, such as by comparing the training object with the groundtruth object. Based on the calculated difference values, the material map generation neural network 230 modifies one or more parameters of the neural network, such that output material data from the neural network 230 (e.g., during an additional round of training, during non-training application of the neural network) provides a rendered object that more closely resembles the groundtruth object.

In some cases, the material map generation neural network 230 identifies features that are particular to a type of texture that is described by the input material data. Continuing with the examples of a leather surface and a metal surface, as mentioned above, the material map generation neural network 230 could identify particular features that contribute to a visual appearance of the particular surface, e.g., leather or metal. In the context of these examples, the material map generation neural network 230 could identify features that are different with respect to the material data for the metal and leather surfaces. For instance, if the source material data 220 and the associated source maps 222 and 224 represent the example leather surface, the material map generation neural network 230 might identify features that indicate a relatively large quantity of variations in surface normal and relatively low albedo, such as a non-reflective surface with subtle shadows or highlights that give the appearance of wrinkles in the leather texture. As an additional example, if the source material data 220 and the associated source maps 222 and 224 represent the example metal surface, the material map generation neural network 230 might identify features that indicate a relatively small quantity of variations in surface normal and relatively high albedo, such as a smooth and highly reflective surface that gives the appearance of the metal texture. In some cases, identifying features that are particular to the texture described by the input material data (e.g., leather, metal) can provide one or more improvements to graphical object rendering techniques, such as improving a visual appearance of a graphical object or improving efficiency of a computing system performing the rendering. For example, in FIG. 2, the appearance-responsive material map set 260 includes material data that is described by the identified features. Additionally or alternatively, the map set 260 omits material data that is not described by the identified features. In some cases, the appearance-responsive material map set 260 is more compact (e.g., requires fewer computing storage resources) than a contemporary set of material maps, such as contemporary maps having naïvely precalculated material data.

In FIG. 2, the appearance-responsive material map generation system 240 generates or modifies the appearance-responsive material map set 260 based on the features identified by the material map generation neural network 230. For example, the material map generation neural network 230 provides, as an output, material data that is associated with the identified features, such as a set of material data that is selected as a subset from the source normal and albedo maps 222 and 224. Additionally or alternatively, the material map generation neural network 230 identifies a particular data element that is associated with a particular identified feature. The particular data elements could be a pixel, a patch of pixels, a texel, a patch of texels, or other suitable types of material data. In some cases, the particular data elements are based on combinations of additional data elements from the input material data. For example, the material map generation neural network 230 could generate an output texel that is a weighted average of multiple input texels from the maps 222 and 224, in which the weights are calculated using one or more of the identified features.

In FIG. 2, the material map generation neural network 230 provides the particular data elements as an output. Additionally or alternatively, the appearance-responsive material map generation system 240 generates (or modifies) the appearance-responsive material map set 260 using the output material data from the material map generation neural network 230. For example, the appearance-responsive material map generation system 240 generates the appearance-responsive material map set 260, including a map 260a, a map 260b, and a map 260c. The map 260a is associated with a first level of detail, such as a level of detail visible (e.g., displayed via a user interface) at a relatively short distance between a graphical object rendered using the maps 260 and a viewpoint in a digital graphical environment. The map 260b is associated with a second level of detail, such as a level of detail visible at an interim distance between the graphical object and the viewpoint. The map 260c is associated with a third level of detail, such as a level of detail visible at a relatively long distance between the graphical object and the viewpoint. In some cases, the appearance-responsive material map set 260 includes maps that depict material at different scales of visibility, such as at a large scale (e.g., visible at the relatively short distance in the digital graphical environment), at a small scale (e.g., visible at the relatively long distance), and at additional scales in between (e.g., visible at one or more interim distances).

In some cases, the appearance-responsive material map set 260 is generated based on additional information indicating the level of detail, such as distance or point-of-view data indicating a close viewpoint, medium viewpoint, or far viewpoint. The additional information could be received by the appearance-responsive material map generation system 240 from an additional computing system, such as point-of-view data 113 from the computing device 190. Additionally or alternatively, the additional information that is stored by the appearance-responsive material map generation system 240, such as a set of default distance values indicating a quantity of maps in the appearance-responsive material map set 260. FIG. 2 depicts the appearance-responsive material map set 260 as including three maps 260a-260c, but other implementations are possible, such as appearance-responsive material map sets with more or fewer maps.

In the appearance-responsive material map generation system 240, the appearance-responsive material map set 260 is arranged as a pyramid, such as an inconsistent pyramid. For example, the appearance-responsive material map set 260 is arranged as an inconsistent pyramid in which pyramid layers (e.g., the maps 260a-260c) have inconsistent relationships. In the map set 260, the map 260a is a first layer with first material data that is based on a first set of features identified by the material map generation neural network 230. The map 260b is a second layer with second material data that is based on a second set of features identified by the material map generation neural network 230. The map 260c is a third layer with third material data that is based on a third set of features identified by the material map generation neural network 230. Each of the first, second, and third material data could be selected from material data in a particular map from the source maps 222 or 224. Additionally or alternatively, each of the first, second, and third material data could be selected from material data in a combination of the source normal and albedo maps 222 and 224. In some cases, the appearance-responsive material map set 260 is arranged as an inconsistent pyramid in which the pyramid layers have material data with inconsistent relationships. For instance, the map set 260 could have multiple relationships in which the second material data in the map 260b is a weighted average of the first material data in the map 260a, and the third material data in the map 260c is an additional (e.g., different) weighted average of a subset (e.g., only albedo data) of the second material data in the map 260b. Additionally or alternatively, the map set 260 could have multiple relations in which the first material data in the map 260a is a combination of about equal portions of normal data and albedo data, the second material data in the map 260b is a combination of about 25% normal data and about 75% albedo data, and the third material data in the map 260c is about 100% albedo data with little or no normal data. Additional inconsistent relationships of the material data or layers in the map set 260 may be suitable.

In some embodiments, the appearance-responsive material map set 260 is an inconsistent pyramid that includes a quantity of layers that is a same quantity of layers in a consistent pyramid of maps (for example, a consistent pyramid from which the source maps 222 and 224 are extracted). Additionally or alternatively, the appearance-responsive material map set 260 is an inconsistent pyramid in which each layer has a same size (e.g., same height, same width) as a respective corresponding layer of the consistent pyramid of maps. In some cases, a pyramid-arranged appearance-responsive material map set having a same quantity of layers, or layers with a same size, as a consistent map set provides improved operation of a computing system that is configured to render graphical objects.

In FIG. 2, the appearance-responsive material map generation system 240 provides the appearance-responsive material map set 260 to the rendering engine 280. Based on the received map set 260, the rendering engine 280 renders one or more 3D graphical objects. For example, the rendering engine 280 renders one or more 3D graphical objects that are included in a digital graphical environment implemented via an additional computing system, such as the graphical environment computing system 105 or the computing device 190. In some cases, the rendering engine 280 renders the 3D graphical object based on additional data, such as data describing a viewpoint distance within the digital graphical environment. The viewpoint distance is included, for example, in point-of-view data 113 (or 113a) generated by the computing device 190 (or the graphical environment computing system 105). In some cases, the rendering engine 280 selects a particular one of, or combination of, the maps 260a-260c for rendering techniques, based on a viewpoint distance associated with the 3D graphical object. For example, responsive to determining that the viewpoint distance to the 3D graphical object is a relatively close viewpoint distance, the rendering engine 280 selects the map 260a for rendering the 3D graphical object. Responsive to determining that the viewpoint distance to the 3D graphical object is, respectively, a medium viewpoint distance or a relatively far viewpoint distance, the rendering engine 280 selects, respectively, the map 260b or the map 260c for rendering the 3D graphical object. In some cases, the rendering engine selects a combination of the maps 260a-260c for rendering techniques. For example, responsive to determining that the viewpoint distance to the 3D graphical object is within an interim range between the relatively close and medium viewpoint distances, the rendering engine generates, for instance, a tri-linear combination of the map 260a and the map 260b, and utilizes the tri-linear combination for rendering the 3D graphical object.

In some cases, the appearance-responsive material map set 260 improves an appearance of rendered objects and improves efficiency of a rendering computing system, as compared to rendering with a contemporary set of material maps. For example, based on the appearance-responsive material map set 260, the rendering engine 280 could render a 3D graphical object with higher accuracy using material data that is relevant to the appearance of the object (e.g., leather-related material data for a leather object or metal-related material data for a metal object). Additionally or alternatively, the rendering engine 280 could render the 3D graphical object with higher efficiency based on the appearance-responsive material map set 260, such as by expending computing resources (e.g., processing, storage) on material data that contributes to an accurate appearance of the 3D graphical object without expending resources on material data that does not contribute to the appearance. In some cases, the appearance-responsive material map set 260 improves operation of the rendering engine 280, based on the map set 260 having a pyramid arrangement with a same quantity and size of layers as consistent map sets. For example, if the rendering engine 280 is configured to receive pyramid map sets (e.g., mipmaps) that include a same quantity and size of layers as the example consistent pyramid, the rendering engine 280 could produce improved output based on the appearance-responsive material map set 260, such as by rendering graphical objects with improved efficiency and quality based on the feature-selected material data in the map set 260. In this example, the rendering engine 280 produces the improved output without internal configuration changes of the rendering engine 280, providing an additional operational improvement of backwards compatibility.

Figure 3:
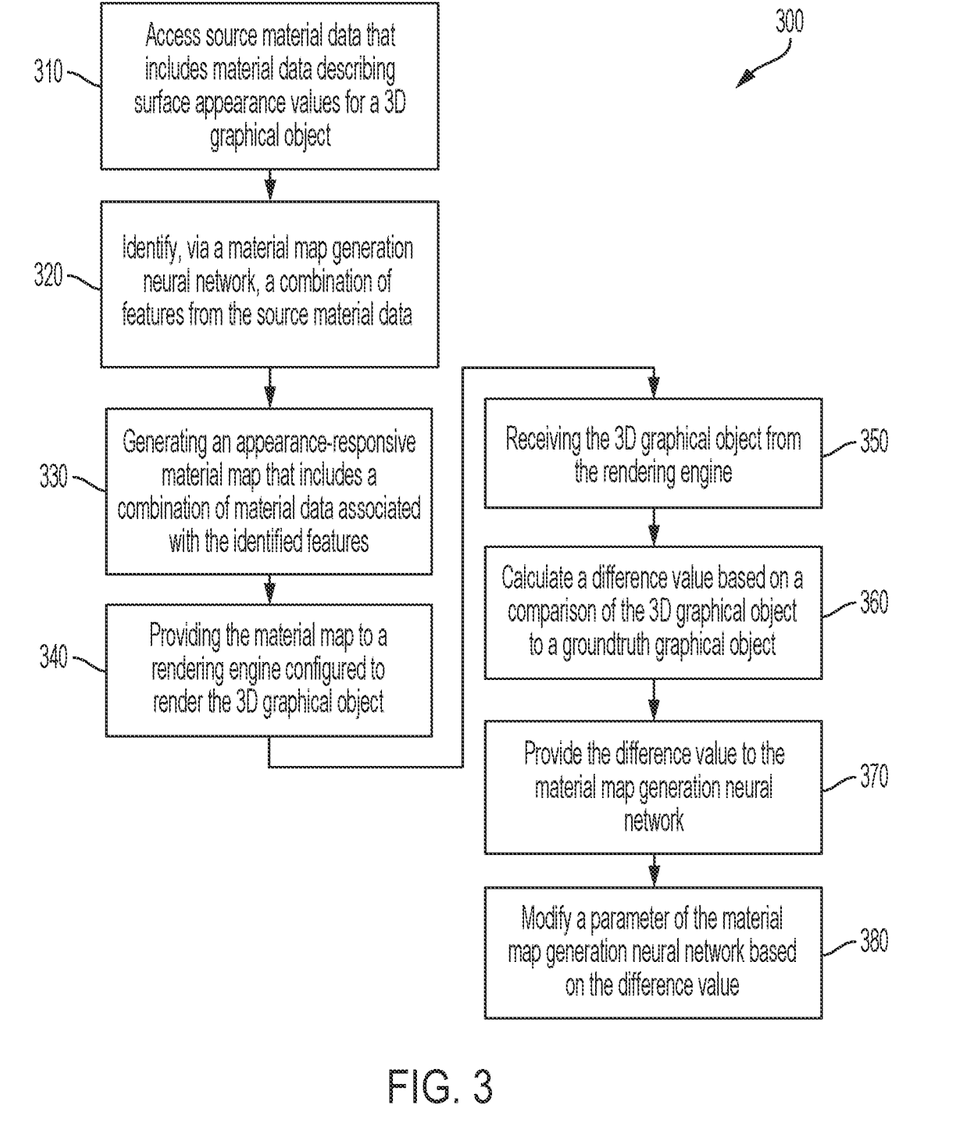
FIG. 3 is a flow chart depicting an example of a process for generating an appearance-responsive material map set, according to certain embodiments.

FIG. 3 is a flow chart depicting an example of a process 300 for generating an appearance-responsive material map set. In some embodiments, such as described in regards to FIGS. 1-2, a computing device executing an appearance-responsive material map generation system implements operations described in FIG. 3, by executing suitable program code. For illustrative purposes, the process 300 is described with reference to the examples depicted in FIGS. 1-2. Other implementations, however, are possible.

At block 310, the process 300 involves accessing source material data, such as a set of one or more source material maps. In some cases, the source material data includes material data that describes surface appearance values for a graphical object. For example, an appearance-responsive material map generation system accesses at least one source material map that describes surface normals, albedo, metallic, roughness, displacement, or other visual appearance characteristics. In some embodiments, the source material maps include material data that describe an appearance of a graphical object, such as a visual surface appearance of a 3D graphical object included within a digital graphical environment. For example, the appearance-responsive material map generation system 240 receives the source material data 220. Additionally or alternatively, the source material data is associated with one or more graphical objects, such as graphical objects included in the digital graphical environment implemented via the graphical environment computing system 105. In some cases, the appearance-responsive material map generation system generates, or otherwise receives, additional material data based on the source material data. For example, the appearance-responsive material map generation system 240 receives the source normal map 222 and the source albedo map 224 based on the source material data 220.

At block 320, the process 300 involves identifying one or more features of the source material data, such as a combination of features from the source material maps. The features are identified, for example, by a material map generation neural network that is trained to identify features that contribute to a visual appearance of a 3D graphical object rendered with the source material data. In some cases, the features are identified from input material data that is provided to the material map generation neural network, such as input material data that includes one or more source material maps. For example, the material map generation neural network 230 receives the source normal and albedo maps 222 and 224. Additionally or alternatively, the material map generation neural network 230 identifies, from the input material data, features of the source material data 220 that contribute to an appearance of a graphical object rendered with the source material data 220. In some cases, the material map generation neural network is trained to identify the features based on a level of detail. For example, the material map generation neural network 230 identifies features from the input material data based on a level of detail associated with various viewpoint distances, such as distances between a graphical object and a viewpoint in a digital graphical environment. Additionally or alternatively, output material data provided by the material map generation neural network 230 is associated with the levels of detail, such as viewpoint distances (or distance ranges) associated with various ones of the maps 260a-260c. In some cases, a particular value for a level of detail is associated with a particular scale of details that are visible to a user (e.g., displayed via a display device) of the digital graphical environment.

At block 330, the process 300 involves generating, by the appearance-responsive material map generation system, an appearance-responsive material map. The appearance-responsive material map includes material data, such as a combination of material data that is associated with the features identified by the material map generation neural network. In some cases, the appearance-responsive material map is included in a set of multiple appearance-responsive material maps. Additionally or alternatively, the appearance-responsive material map is included in an inconsistent pyramid, such as a layer of an appearance-responsive material map set that is arranged as an inconsistent pyramid. For example, the appearance-responsive material map generation system 240 generates (or modifies) each of the maps 260a-260c in the appearance-responsive material map set 260. Additionally or alternatively, each of the maps 260a-260c includes a combination of one or more data elements, such as pixels or texels, that are associated with the features identified by the material map generation neural network 230. In some cases, each of the maps 260a-260c corresponds to a respective level of detail, such as viewpoint distances (or ranges) associated with the levels of detail via which the features are identified.

At block 340, the process 300 involves providing the appearance-responsive material map to a rendering system, such as a computing system that is configured to render a 3D graphical object. In some cases, the appearance-responsive material map generation system provides the appearance-responsive material map to a rendering system that is included in, or otherwise in communication with, a computing system that implements a digital graphical environment. In some cases, the rendering system can be a rendering subsystem or a rendering engine. For example, the appearance-responsive material map generation system 240 provides the appearance-responsive material map set 260 to the rendering engine 280. Additionally or alternatively, the rendering engine 280 renders one or more 3D graphical objects, such that the rendered objects have a visual appearance described by the map set 260. In some cases, the rendering engine 280 selects a particular one of, or combination of, the maps 260a-260c for rendering techniques, based on a viewpoint distance associated with the 3D graphical object. In some cases, the rendered objects are included in a digital graphical environment. For instance, the rendering engine 280 could provide the rendered objects to one or more of the graphical environment computing system 105 or the computing device 190. Additionally or alternatively, the rendered objects could be displayed to a user of the digital graphical environment, such as via a display device or other user interface device.

At block 350, the process 300 involves receiving at least one rendered object from the rendering system, such as the 3D graphical object that was rendered using the appearance-responsive material map. In some cases, the rendered object is received, or otherwise accessed, during a training or re-training phase for the material map generation neural network. For example, the appearance-responsive material map generation system 240 receives, from the rendering engine 280, a 3D graphical object rendered using the appearance-responsive material map set 260. In some cases, the rendered object is a training object. For example, the appearance-responsive material map generation system 240 receives or accesses the rendered object during a training phase, or a re-training phase, of the material map generation neural network 230.

At block 360, the process 300 involves calculating one or more difference values between the received rendered object, such as a training object, and a groundtruth graphical object. For example, the appearance-responsive material map generation system or the material map generation neural network compares the received rendered object with the groundtruth graphical object, such as by performing a comparison of surface appearance characteristics of the received object and the groundtruth object. The compared surface appearance characteristics could include, for instance, color, brightness, reflectivity (e.g., albedo, metallic), shadow (e.g., normals, roughness), edges, or other visual characteristics of 3D graphical objects. Based on the comparison, the appearance-responsive material map generation system or the material map generation neural network calculates one or more difference values that describe whether the surface appearance characteristics of the objects are similar, e.g., within a training threshold value, or dissimilar, e.g., outside the training threshold value. For example, the appearance-responsive material map generation system 240 calculates, during a training phase, one or more difference values between the groundtruth object and the rendered 3D graphical object generated by the rendering engine 280 using the appearance-responsive material map set 260.

At block 370, the process 300 involves providing the one or more difference values to the material map generation neural network. For example, the appearance-responsive material map generation system 240 provides the one or more difference values to the material map generation neural network 230.

At block 380, the process 300 involves modifying, based on the one or more difference values, a parameter of the material map generation neural network. In some cases, the material map generation neural network modifies at least one parameter responsive to determining that a difference value is outside of the training threshold value, such as determining that a particular surface appearance characteristic of the received rendered object is dissimilar from a corresponding surface appearance characteristic of the groundtruth object. For example, the material map generation neural network 230 modifies, during a training phase, one or more of its parameters responsive to determining that a particular difference value between the groundtruth object and the rendered 3D graphical object from the rendering engine 280 is outside of a threshold training value.

In some embodiments, operations related to one or more blocks of the process 300 are repeated. For example, during a training or re-training phase, the appearance-responsive material map generation system or the material map generation neural network could repeat one or more operations related to blocks 320-380. In some cases, the one or more operations are repeated until a threshold similarity is reached between the groundtruth object and rendered 3D graphical objects received from the rendering system (e.g., additional rendered 3D graphical objects are within the threshold training value).

Figure 4:
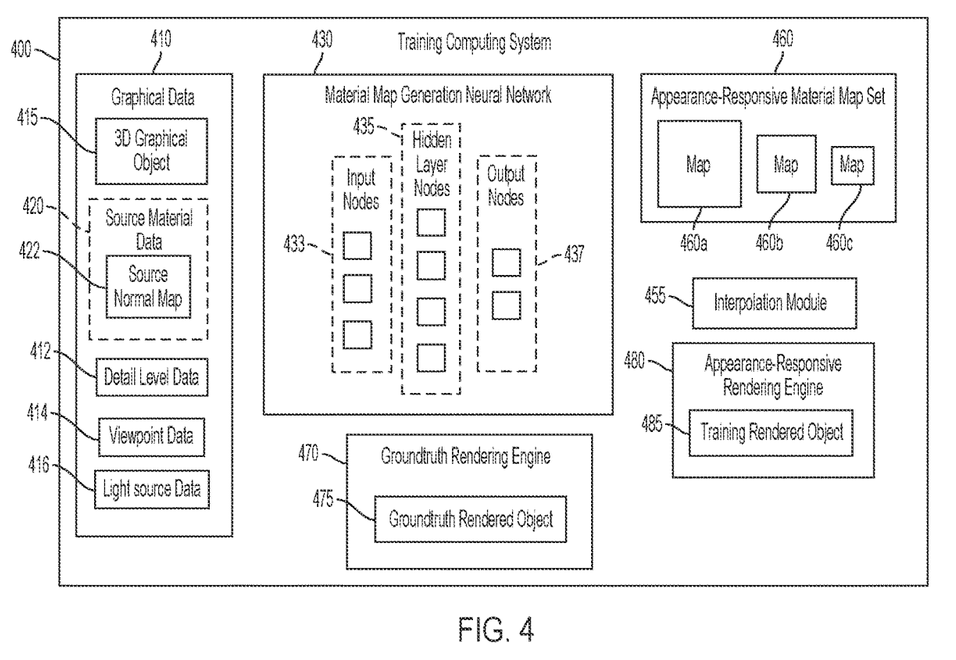
FIG. 4 is a diagram depicting an example of a training computing system in which a material map generation neural network is trained to generate one or more appearance-responsive material map sets, according to certain embodiments.

FIG. 4 depicts an example of a training computing system 400 in which a material map generation neural network 430 is trained to generate one or more appearance-responsive material map sets, such as an appearance-responsive material map set 460 that is generated during a training or re-training phase of a material map generation neural network 430. The training computing system 400 includes the material map generation neural network 430, a groundtruth rendering engine 470, an appearance-responsive rendering engine 480, and an interpolation module 455. In some cases, one or more of the material map generation neural network 430, the groundtruth rendering engine 470, the appearance-responsive rendering engine 480, or the interpolation module 455 are included in, or configured to communicate with, an appearance-responsive material map generation system, such as the appearance-responsive material map generation system 240. FIG. 4 depicts the groundtruth rendering engine 470, the appearance-responsive rendering engine 480, and the interpolation module 455 as being included in the training computing system 400, but other implementations are possible. For example, a material map generation neural network could be implemented in a computing system, such as an appearance-responsive material map generation system, that is configured to communicate with one or more additional computing systems that implement a groundtruth engine, an appearance-responsive rendering engine, or an interpolation module.

In the training computing system 400, the material map generation neural network 430 includes multiple neural network layers, including an input layer for the neural network, one or more hidden layers for the neural network, and an output layer for the neural network. In the material map generation neural network 430, the input layer includes one or more input nodes 433, the hidden layer includes one or more hidden layer nodes 435, and the output layer includes one or more output nodes 437. Additionally or alternatively, the material map generation neural network 430 is arranged as a fully-connected multi-layer perceptron, in which each of the input nodes 433 has a connection with each of the hidden layer nodes 435, and each of the hidden layer nodes 435 has a connection with each of the output nodes 437. FIG. 4 describes the material map generation neural network 430 as a fully-connected multi-layer perceptron, but other implementations are possible, including other architectures of neural networks. In FIG. 4, the material map generation neural network 430 has a single hidden layer with the hidden layer node 435, but other implementations are possible, such as an material map generation neural network with multiple hidden layers. In an example configuration, the material map generation neural network 430 includes a relatively small number of neural network layers (e.g., about 3-5 neural network layers), and each of the neural network layers includes a relatively small number of nodes (e.g., about 3-8 nodes). In some implementations, an material map generation neural network having a relatively small number of neural network layers each with a relatively small number of nodes provides improved performance, such as reduced training time.

In some implementations, the training computing system 400 receives graphical data 410. The graphical data 410 includes data for rendering one or more graphical objects within a digital graphical environment. For example, the graphical data 410 includes one or more of geometry data describing a 3D graphical object 415, material data describing visual surface appearance characteristics of the 3D graphical object 415, or other data describing the 3D graphical object 415. In some cases, the graphical data 410 includes data that describes a digital graphical environment that includes the 3D graphical object 415, such as point-of-view data describing a distance or angle of a viewpoint (e.g., of a user data object) relative to the 3D graphical object 415, environment data describing characteristics of the digital graphical environment (e.g., light sources, fog/visibility effects), or other data describing the digital graphical environment. In some cases, the graphical data 410 is received from one or more additional computing systems. For example, the graphical data 410 is received from a computing system configured to implement the digital graphical environment, such as the graphical environment computing system 105 or the computing device 190. Additionally or alternatively, the graphical data 410 is received from a repository of graphical data, such as a database that stores training data describing multiple graphical objects or multiple digital graphical environments.

In FIG. 4, the graphical data 410 includes data describing the 3D graphical object 415. Additionally or alternatively, the graphical data 410 includes source material data 420 that describes visual surface appearance characteristics of the 3D graphical object 415. The source material data 420 can include one or more source material maps, such as source material maps describing surface normals, albedo, metallic, roughness, displacement, or other types of source maps describing texture characteristics. In FIG. 4, the source material data 420 includes a source normal map 422. In some cases, the graphical data 410 includes material data maps that are extracted from, or otherwise associated with, additional material data that is provided by an additional computing system, such as additional material data arranged as a consistent pyramid. For example, the source normal map 422 could be a high-resolution layer extracted from a consistent pyramid of material maps having a predetermined relationship among layers (e.g., one-half resolution of a previous layer). FIG. 4 depicts the source material data 420 as including the source normal maps 422, but additional source material maps may be included, such as material maps for albedo, metallic, roughness, displacement, or other texture characteristics.

In some embodiments, the graphical data 410 includes one or more of detail level data 412, viewpoint data 414, or light source data 416. For example, the viewpoint data 414 describes a position of a viewpoint (e.g., of a user data object) within the digital graphical environment, such as a location, an angle, a distance to the 3D graphical object 415, or other characteristics of the viewpoint. Additionally or alternatively, the light source data 416 describes one or more light source data objects in the digital graphical environment, such as a position of a particular light source, an intensity (e.g., sunlight, a flashlight), a color spectrum, a quantity of light sources, or other characteristics of a light source within the digital graphical environment. Furthermore, the detail level data 412 describes a level of detail that is associated with the 3D graphical object 415, such as a scale at which details of the surface of the 3D graphical object 415 are depicted (e.g., via a display device) to a user of the digital graphical environment. In some cases, the detail level data 412 is determined based on one or more of the viewpoint data 414 or the light source data 416, such as by calculating a level of detail using an intensity of the light source or a distance between the viewpoint and the 3D graphical object 415.

In FIG. 4, the material map generation neural network 430 receives the source normal map 422 as input material data for training. Additionally or alternatively, the material map generation neural network 430 receives the detail level data 412 as additional input data for training. In some cases, the detail level data 412 includes multiple values indicating a range of detail levels. For example, the detail level data 412 includes a first value indicating a relatively high level of detail, such as high-quality texture details that are visible at a close distance between the viewpoint and the 3D graphical object 415. The first value of the detail level data 412 may be associated with first features of the source normal map 422 that contribute to a rendered appearance of the 3D graphical object 415 at the close distance. Additionally or alternatively, the detail level data 412 includes a second value indicating a medium level of detail associated with second features of the source normal map 422 that contribute to the rendered appearance of the 3D graphical object 415 at a medium distance between the viewpoint and the 3D graphical object 415. Furthermore, the detail level data 412 includes a third value indicating a relatively low level of detail associated with third features of the source normal map 422 that contribute to the rendered appearance of the 3D graphical object 415 at a far distance between the viewpoint and the 3D graphical object 415.

During a training phase or a re-training phase of the material map generation neural network 430, each of the input nodes 433 receives at least a portion of the source normal map 422. Additionally or alternatively, each of the input nodes 433 receives a level of detail value from the detail level data 412. In some cases, the detail level value is random, such as a randomized detail level utilized for training. In the material map generation neural network 430, each of the input nodes 433 respectively selects (or otherwise receives) a group of input data elements, such as a particular patch of input texels from the source normal map 422. Each of the input nodes 433 provides the respective input data elements to each of the hidden layer nodes 435.

In some cases, the hidden layer nodes 435 receive the detail level value, such as from the input nodes 433. Based on the input data elements, each of the hidden layer nodes 435 calculates (or modifies) at least one parameter describing a relationship among the data elements. In some cases, the parameter is calculated based on the detail level value. In some cases, the parameters of hidden layer nodes 435 identify features of the source material data 420 that are associated with particular values for the detail level data. For example, responsive to receiving a detail level value indicating that the detail level is high (e.g., the 3D graphical object 415 is viewed at a close distance), each of the hidden layer nodes 435 calculates a relationship among the data elements that provides a high level of detail. Using the calculated relationships, the hidden layer nodes 435 may identify a group of features that contribute to a rendered appearance of the 3D graphical object 415 at the high level of detail. Additionally or alternatively, responsive to receiving an additional detail level value indicating that the detail level is low (e.g., the 3D graphical object 415 is viewed at a far distance), each of the hidden layer nodes 435 calculates an additional relationship among the data elements that provides a low level of detail. Using the additional calculated relationships, the hidden layer nodes 435 may identify an additional group of features that contribute to a rendered appearance of the 3D graphical object 415 at the low level of detail. In some cases, a particular feature of the source normal map 422 may be included in one, both, or neither of the groups of features.

In the material map generation neural network 430, each of the hidden nodes 435 provides the calculated parameters to each of the output nodes 437. Based on the calculated parameters, each of the output nodes 437 determines a group of output data elements, such as a particular patch of output texels. As an example, the output data elements could include a combination of the input data elements received by the input nodes 433, in which the combination is determined according to the parameters calculated by the hidden layer nodes 435.

In the training computing system 400, the appearance-responsive material map set 460 is generated based on a combination of the output data elements. In some cases, each map included in the map set 460 is associated with a particular level of detail from the detail level data 412. For example, a first map 460a in the map set 460 is associated with the first detail level value indicating a relatively high level of detail. The map 460a is generated by combining output data elements that were calculated based on a high level of detail. Additionally or alternatively, a second map 460b in the map set 460 is associated with the second detail level value indicating a medium level of detail, and the map 460b is generated by combining output data elements that were calculated based on a medium level of detail. Furthermore, a third map 460c in the map set 460 is associated with the third detail level value indicating a relatively low level of detail, and the map 460c is generated by combining output data elements that were calculated based on a low level of detail.

In FIG. 4, the interpolation module 455 receives the appearance-responsive material map set 460. In some cases, the interpolation module 455 applies at least one interpolation technique, such as tri-linear interpolation, to the appearance-responsive material map set 460. For example, the interpolation module 455 generates interim material data values that are a combination of data values from the map 460a and the map 460b by interpolating texels (or other data elements) from the maps 460a and 460b. In some cases, the interpolation module 455 generates the interim material data values based on the detail level data 412, such as by identifying a subset of the maps 460a-460c that are associated with a particular detail level value. FIG. 4 depicts the appearance-responsive material map set 460 as being received by the interpolation module 455, but other implementations are possible, such as in a computing environment that omits interpolation.

In the training computing system 400, the appearance-responsive rendering engine 480 receives the appearance-responsive material map set 460. Additionally or alternatively, the appearance-responsive rendering engine 480 receives one or more of the viewpoint data 414 or the light source data 416. In some cases, the appearance-responsive rendering engine 480 receives interpolation values generated via the interpolation module 455.

During a training or re-training phase, the appearance-responsive rendering engine 480 generates a training rendered object 485. The training rendered object 485 is a rendering of the 3D graphical object 415 having the surface appearance described by the appearance-responsive material map set 460. In some cases, the training rendered object 485 is rendered based on one or more of the viewpoint data 414 or the light source data 416, such as at a particular viewpoint distance or a particular light source direction. Additionally or alternatively, the training rendered object 485 is rendered based on multiple viewpoints or multiple light sources described by the viewpoint data 414 or the light source data 416. For example, the appearance-responsive rendering engine 480 performs multiple renderings of the training rendered object 485 at a range of viewpoint distances or angles, or at a range of light source distances or intensities.

Additionally or alternatively, the groundtruth rendering engine 470 renders one or more reference objects, such as a groundtruth rendered object 475. For example, the groundtruth rendered object 475 is rendered by the groundtruth rendering engine 470 based on the source material data 420. In some cases, the groundtruth rendering engine 470 performs multiple renderings of the groundtruth rendered object 475 based on multiple viewpoints or multiple light sources described by the viewpoint data 414 or the light source data 416. In some embodiments, the groundtruth rendering engine 470 is a high-quality rendering engine that utilizes a large amount of material data from the source material data 420. Additionally or alternatively, the groundtruth rendering engine 470 is an "offline" engine that is suitable for rendering objects that are static, such as objects that are not included in an interactive digital graphical environment. For example, the groundtruth rendering engine 470 renders slowly as compared to, for instance, the appearance-responsive rendering engine 480 or the rendering engine 180 described in regards to FIG. 1. In some cases, the groundtruth rendering engine 470 renders slowly as compared to network interactions by the computing device 190, and may be unsuitable for the interactive digital graphical environment implemented by the graphical environment computing system 105.

In FIG. 4, the training computing system 400 utilizes the groundtruth rendered object 475 as a reference object against which the training rendered object 485 is compared. For example, the training rendered object 485 is compared to the groundtruth rendered object 475. Additionally or alternatively, multiple renderings of the training rendered object 485 are compared to multiple renderings of the groundtruth rendered object 475, such as comparisons of particular renderings at a particular combination of viewpoint and light source. The training computing system 400 calculates one or more difference values between the training rendered object 485 and the groundtruth rendered object 475, such as by calculating a result of a loss function between the objects 485 and 475. For example, the difference values describe a similarity (or dissimilarity) between surface appearance characteristics of the objects 485 and 475. In some cases, the difference values are received by the material map generation neural network 430. Based on the difference values, the material map generation neural network 430 modifies one or more parameters, such as parameters of the hidden layer nodes 435.

During an additional training or re-training phase, the material map generation neural network 430 generates modified output material data based on the input source normal map 422, such as by calculating modified data element relationships described by the modified parameters. The training computing system 400 generates a modified appearance-responsive material map using the modified output material data, and the appearance-responsive rendering engine 480 generates an additional training rendered object based on the modified appearance-responsive material map. In some cases, the training computing system 400 performs multiple iterations of modifying appearance-responsive material maps, comparing training rendered objects to the groundtruth rendered object 475, and modifying parameters of the material map generation neural network 430, such as iterative modifications until the additional training rendered object is sufficiently similar (e.g., within a similarity threshold) to the groundtruth rendered object 475.

Figure 5:
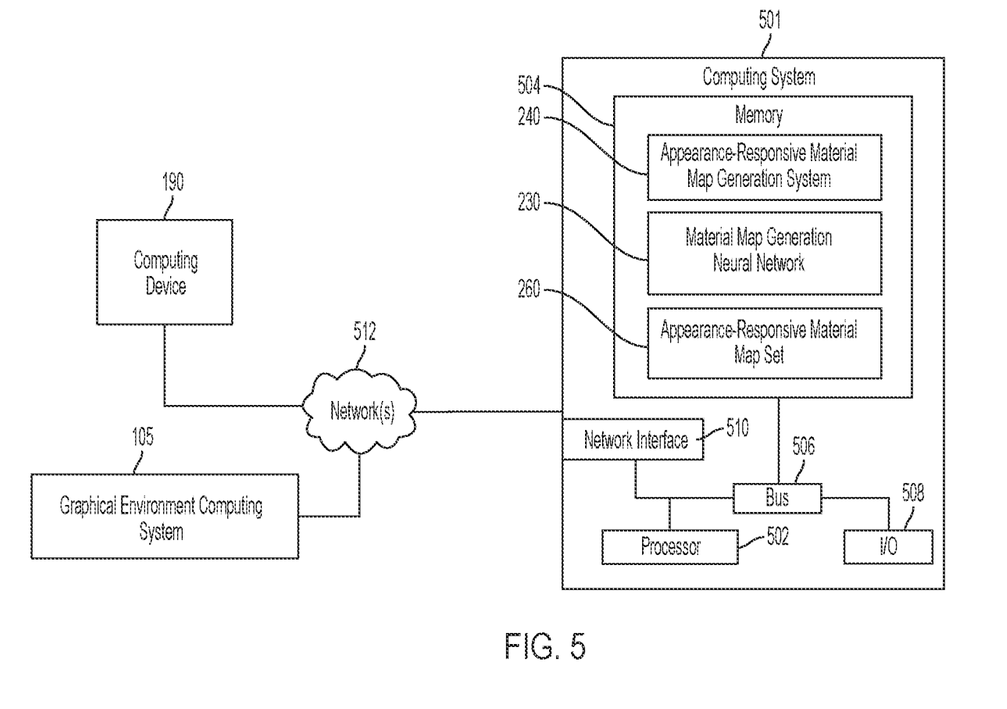
FIG. 5 is a diagram depicting an example of a computing system configured for generating an appearance-responsive material map set, according to certain embodiments.

Any suitable computing system or group of computing systems can be used for performing the operations described herein. For example, FIG. 5 is a block diagram depicting a computing system configured to generate an appearance-responsive material map set, according to certain embodiments.

The depicted example of a computing system 501 includes one or more processors 502 communicatively coupled to one or more memory devices 504. The processor 502 executes computer-executable program code or accesses information stored in the memory device 504. Examples of processor 502 include a microprocessor, an application-specific integrated circuit ("ASIC"), a field-programmable gate array ("FPGA"), or other suitable processing device. The processor 502 can include any number of processing devices, including one.

The memory device 504 includes any suitable non-transitory computer-readable medium for storing the appearance-responsive material map generation system 240, the material map generation neural network 230, the appearance-responsive material map set 260, and other received or determined values or data objects. The computer-readable medium can include any electronic, optical, magnetic, or other storage device capable of providing a processor with computer-readable instructions or other program code. Non-limiting examples of a computer-readable medium include a magnetic disk, a memory chip, a ROM, a RAM, an ASIC, optical storage, magnetic tape or other magnetic storage, or any other medium from which a processing device can read instructions. The instructions may include processor-specific instructions generated by a compiler or an interpreter from code written in any suitable computer-programming language, including, for example, C, C++, C#, Visual Basic, Java, Python, Perl, JavaScript, and ActionScript.

The computing system 501 may also include a number of external or internal devices such as input or output devices. For example, the computing system 501 is shown with an input/output ("I/O") interface 508 that can receive input from input devices or provide output to output devices. A bus 506 can also be included in the computing system 501. The bus 506 can communicatively couple one or more components of the computing system 501.

The computing system 501 executes program code that configures the processor 502 to perform one or more of the operations described above with respect to FIGS. 1-4. The program code includes operations related to, for example, one or more of the appearance-responsive material map generation system 240, the material map generation neural network 230, the appearance-responsive material map set 260, or other suitable applications or memory structures that perform one or more operations described herein. The program code may be resident in the memory device 504 or any suitable computer-readable medium and may be executed by the processor 502 or any other suitable processor. In some embodiments, the program code described above, the appearance-responsive material map generation system 240, the material map generation neural network 230, and the appearance-responsive material map set 260 are stored in the memory device 504, as depicted in FIG. 5. In additional or alternative embodiments, one or more of the appearance-responsive material map generation system 240, the material map generation neural network 230, the appearance-responsive material map set 260, and the program code described above are stored in one or more memory devices accessible via a data network, such as a memory device accessible via a cloud service.

The computing system 501 depicted in FIG. 5 also includes at least one network interface 510. The network interface 510 includes any device or group of devices suitable for establishing a wired or wireless data connection to one or more data networks 512. Non-limiting examples of the network interface 510 include an Ethernet network adapter, a modem, and/or the like. The computing system 501 is able to communicate with one or more additional computing systems, such as the computing device 190 or the graphical environment computing system 105, using the network interface 510.

General Considerations

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

What is claimed is:

1. A system for generating an appearance-responsive material map, the system comprising:
    an appearance-responsive material map generation subsystem configured for:
        accessing source material data, the source material data including material data that describes one or more surface appearance values associated with a three-dimensional ("3D") graphical object;
        identifying, via a trained material map generation neural network, a combination of features from the source material data, wherein the trained material map generation neural network is trained to select the combination of features based on a detail level;
        generating an appearance-responsive material map that includes a combination of material data from the source material data, the combination of material data associated with the identified combination of features; and
        providing the appearance-responsive material map to a rendering subsystem; and
    the rendering subsystem, which is configured for:
        selecting the appearance-responsive material map based on a viewpoint distance, and
        rendering the 3D graphical object having a visual appearance that is based on the appearance-responsive material map.

2. The system of claim 1, the appearance-responsive material map generation subsystem further configured for:
    receiving the 3D graphical object from the rendering subsystem;
    calculating a difference value based on a comparison of the 3D graphical object to a groundtruth graphical object; and
    providing the difference value to the trained material map generation neural network, wherein the trained material map generation neural network modifies one or more parameters based on the difference value.

3. The system of claim 1, wherein the rendering subsystem is configured to select the appearance-responsive material map responsive to identifying an association of the viewpoint distance with the appearance-responsive material map.

4. The system of claim 1, wherein the source material data includes one or more of: an albedo material map, a metallic material map, a roughness material map, a normal material map, or a displacement material map.

5. The system of claim 1, the appearance-responsive material map generation subsystem further configured for:
    identifying a source material map included in the source material data; and
    providing the source material map to the trained material map generation neural network as input material data.

6. The system of claim 5, wherein the trained material map generation neural network is further configured for:
    generating output material data that includes a combination of the input material data, wherein the combination of the input material data is identified based on the combination of features.

7. The system of claim 6, wherein the output material data is arranged as an inconsistent pyramid of material maps, in which:
    the appearance-responsive material map is arranged as a particular layer of the inconsistent pyramid of material maps, and
    the viewpoint distance is associated with the particular layer.

8. A non-transitory computer-readable medium embodying program code for generating an appearance-responsive material map, the program code comprising instructions which, when executed by a processor, cause the processor to perform:
    accessing source material data, the source material data including material data that describes one or more surface appearance values associated with a three-dimensional ("3D") graphical object;
    identifying, via a trained material map generation neural network, a combination of features from the source material data, wherein the trained material map generation neural network is trained to select the combination of features based on a detail level;

generating an appearance-responsive material map that includes a combination of material data from the source material data, the combination of material data associated with the identified combination of features; and providing the appearance-responsive material map to a rendering engine that is configured to render the 3D graphical object having a visual appearance that is based on the appearance-responsive material map and a viewpoint distance.

9. The non-transitory computer-readable medium of claim 8, the program code further comprising instructions which cause the processor to perform:

receiving the 3D graphical object from the rendering engine;

calculating a difference value based on a comparison of the 3D graphical object to a groundtruth graphical object; and providing the difference value to the trained material map generation neural network, wherein the trained material map generation neural network modifies one or more parameters based on the difference value.

10. The non-transitory computer-readable medium of claim 8, wherein the source material data includes one or more of: an albedo material map, a metallic material map, a roughness material map, a normal material map, or a displacement material map.

11. The non-transitory computer-readable medium of claim 8, the program code further comprising instructions which cause the processor to perform:

identifying a source material map included in the source material data; and providing the source material map to the trained material map generation neural network as input material data.

12. The non-transitory computer-readable medium of claim 11, wherein the trained material map generation neural network is configured for:

generating output material data that includes a combination of the input material data, wherein the combination of the input material data is identified based on the combination of features.

13. The non-transitory computer-readable medium of claim 12, wherein the output material data is arranged as an inconsistent pyramid of material maps, in which:

the appearance-responsive material map is arranged as a particular layer of the inconsistent pyramid of material maps, and the viewpoint distance is associated with the particular layer.

14. A method for generating an appearance-responsive material map, the method comprising operations that, when executed by one or more processors, cause the one or more processors to perform:

accessing source material data, the source material data including material data that describes one or more surface appearance values associated with a three-dimensional ("3D") graphical object;

identifying, via a material map generation neural network, a combination of features from the source material data, wherein the material map generation neural network is trained to select the combination of features based on a detail level;

generating an appearance-responsive material map that includes a combination of material data from the source material data, the combination of material data associated with the identified combination of features;

providing the appearance-responsive material map to a rendering engine that is configured to render the 3D graphical object having a visual appearance that is based on the appearance-responsive material map and a viewpoint distance;

receiving, from the rendering engine, the rendered 3D graphical object;

calculating a difference value based on a comparison of the 3D graphical object to a groundtruth graphical object; and providing the difference value to the material map generation neural network, wherein the material map generation neural network modifies one or more parameters based on the difference value.

15. The method of claim 14, wherein the rendering engine is configured to select the appearance-responsive material map responsive to identifying an association of the viewpoint distance with the appearance-responsive material map.

16. The method of claim 14, wherein the source material data includes one or more of: an albedo material map, a metallic material map, a roughness material map, a normal material map, or a displacement material map.

17. The method of claim 14, the operations further causing the one or more processors to perform:

identifying a source material map included in the source material data; and providing the source material map to the material map generation neural network as input material data.

18. The method of claim 17, wherein the material map generation neural network is further configured for:

generating output material data that includes a combination of the input material data, wherein the combination of the input material data is identified based on the combination of features.

19. The method of claim 18, wherein the output material data is arranged as an inconsistent pyramid of material maps, in which:

the appearance-responsive material map is arranged as a particular layer of the inconsistent pyramid of material maps, and the viewpoint distance is associated with the particular layer.

20. The method of claim 14, wherein the material map generation neural network is a fully-connected multi-layer perceptron.

* * * * *